Nov. 23, 1971  D. E. GETCHELL  3,621,542
PRESSURIZED SUIT FABRIC CONVOLUTE MANIPULATION
THROUGH MATERIAL DISTRIBUTION
Filed Dec. 20, 1968  2 Sheets-Sheet 1

INVENTOR
DOUGLAS E. GETCHELL
BY Melvin Pearson Williams
ATTORNEY

Nov. 23, 1971  D. E. GETCHELL  3,621,542
PRESSURIZED SUIT FABRIC CONVOLUTE MANIPULATION
THROUGH MATERIAL DISTRIBUTION
Filed Dec. 20, 1968  2 Sheets-Sheet 2

United States Patent Office 3,621,542
Patented Nov. 23, 1971

3,621,542
PRESSURIZED SUIT FABRIC CONVOLUTE
MANIPULATION THROUGH MATERIAL
DISTRIBUTION
Douglas E. Getchell, Windsor Locks, Conn., assignor to
United Aircraft Corporation, East Hartford, Conn.
Filed Dec. 20, 1968, Ser. No. 785,693
Int. Cl. A41d *13/00;* A63c *11/04*
U.S. Cl. 28—72
4 Claims

ABSTRACT OF THE DISCLOSURE

Root cords in fabric convolutes are displaced relative to the general center line of restraint fabric material of which a generally tubular section of convolutes is comprised in order to stabilize or displace given convolutes with respect to other convolutes in the section. Further, the amount of fabric adjacent to various incremental lengths of a root cord is adjusted differentially so as to alter the characteristics of one or more convolutes formed thereby. The invention is illustrated in terms of overcoming adverse effects of repetitive bending of joints, and in terms of overcoming a tendency toward cutting in as a result of wedge-shaped convolutes.

BACKGROUND OF THE INVENTION

Field of invention

This invention relates to pressurized suits of the type utilized in high altitude aviation and space exploration and more particularly to the manipulation of fabric convolutes therein.

Description of the prior art

In order to provide break points as well as hoop load restraint in pressurized suits, convolutes have been utilized which are formed of generally flat sections of restraint fabric having root cords dispersed at intervals about the section. Each of the root cords forms a point where the section may break or bend, as a result of flexure of the wearer, and each root cord keeps the section from from ballooning outwardly as a result of radial forces on the section which are due to pressure within the suit. Heretofore, most pressurized suits are formed of dipped material, or rubberized fabric, and convolute formation has resulted through the application of heat and pressure, or through the application of rubber to fabric while the fabric is in a mold and threby forced into a convolute shape. Such material maintains a bulky shape when unpressurized as well as when pressurized, and is therefore cumbersome when within a space craft or other vehicle and the suit need not be pressurized.

A preferred form of formulating pressurized suits is the utilization of restraint fabric with root cords at various positions along the fabric. However, various problems have ensued as a result of dynamic differences between the root cords and the fabric sections being restrained thereby. For instance, if a joint, such as a waist, includes fabric convolutes formed by root cords disposed on restraint fabric, as a result of bending forwardly many times, the fabric redistributes itself along the root cord and tends to make the suit assume a forwardly bent position, which can result in cutting in to the wearer at the front of the suit. Furthermore, if any of the convolute sections comprised of root restrained fabric have a wedge-shape, there is a tendency for these to shear outwardly in the same fashion as a wedge would tend to move in a direction away from its apex. Further, when a joint (such as an elbow) is bent, instead of the convolute sections collapsing at the inside of the bend and stretching at the outside of the bend, without a transfer of positions, those convolutes which are closest to the apex of the bend are caused to shear outwardly away from the apex of the bend.

SUMMARY OF INVENTION

The object of the present invention is to provide convolute stabilization, control over convolute position, and nonshearing flexure sections of convolutes in a pressurized suit.

According to the present invention, the amount of fabric adjacent to various incremental lengths of a root cord is adjusted differentially so as to alter the characteristics of one or more convolutes formed thereby. In accordance with the invention, the axis of a root of a convolute is displaced relative to the axis of the basic restraint material of a convolute in order to alter the characteristics of the convolute. In further accord with the present invention, a tendency of a convolute to shear in a given direction is offset by loading the root cords of the convolute with fabric in the area of the cord which is in the direction of the tendency to shear. In still further accord with the present invention, a tendency for a given root to cut into the wearer of a pressurized suit is overcome by providing relatively more cord per unit length of fabric in the area of cord adjacent to the cut-in.

The present invention permits eliminating shears and cutting in that results therefrom, provides preloading a convoluted section to influence its behavior in flexure, provides for establishing preferential break points, and provides the ability to stabilize given sections of convolutes so as to retain an overall section having a predictable behavior pattern in both neutral and flexed conditions.

The foregoing and other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
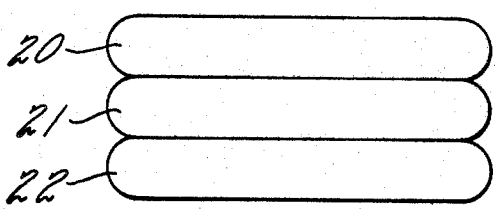
FIGS. 1–4 are schematicized side elevations of a toroidal analogy to the behavior of convolutes in a pressurized suit.
Figure 2:
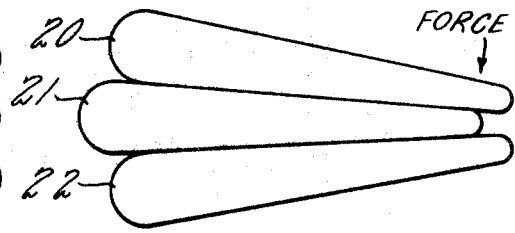

Referring now to FIGS. 1-4, consider the behavior of three toroids made of generally flexible material (such as rubber or fabric) when inflated and thus experiencing a pressure differential from the inside to the outside. Such toroids may comprise, for instance, automobile tire inner tubes. If the toroids are evenly stacked as in FIG. 1, and then a force is applied to one edge of the stack so as to compress the stack as illustrated in FIG. 2, the toroids will not only assume a tapered or wedge-shape, but the center toroid 21 will tend to slide outwardly in a direction diametrically opposite to the point of application of force. This is as a result of the pressure within the toroid 21 being capable of exerting a greater force to the left as viewed in FIG. 2 than to the right, due to the fact that there is a greater area responsive to horizontal force components toward the left at the left side than there is area responsive to horizontal force components toward the right at the right side, when the toroid is compressed at the right side as illustrated in FIG. 2. This assumes that the friction between the toroids is sufficiently low so that the force which tends to cause the sliding will overcome the frictional force. Such an assumption is valid, as will become more apparent in the description hereinafter, since there is relatively little friction between convolutes in a space suit.

Figure 3:
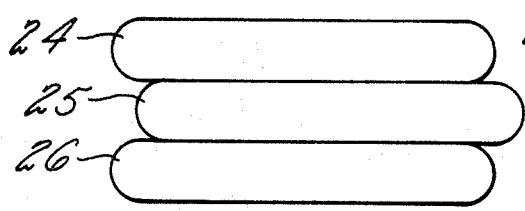
Figure 4:
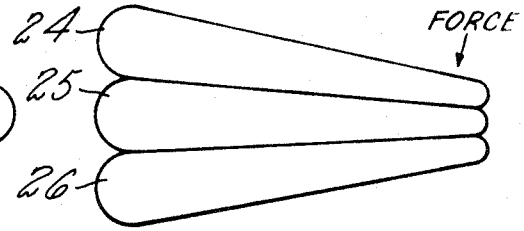

In contrast, if three toroids are stacked unevenly, as shown by toroids 24-26 in FIG. 3, and then a force is applied at the point where the center toroid protrudes (to the right in FIG. 4), the tendency to be displaced away from the point of application of the force merely brings the toroid 25 substantially in line with other toroids 24, 26. The behavior of toroids as shown in FIGS. 1-4 illustrates a principal feature of the present invention; it has been discovered that convolutes in a pressurized suit behave in a manner which is basically similar to that just described with respect to individual toroids, even though the convolutes in a pressurized suit in fact represent (when considered ideally) only the outer most peripheral surfaces of a series of toroids.

Figure 5A:
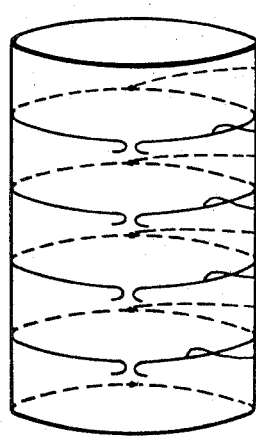
FIGS. 5a and 5b are schematicized illustrations of the formulation of a convolute section altered in accordance with the present invention.
Figure 5B:
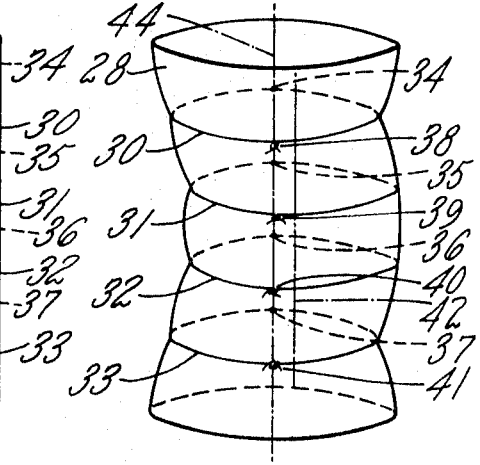
Figure 6:
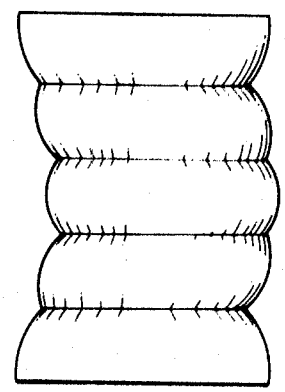
FIG. 6 is a side elevation, partially schematicized, of a convolute section in acordance with the present invention.

According to the present invention, a convolute section having one or more convolutes with a displaced root axis can be formed in a manner illustrated schematically in FIGS. 5a and 5b. In FIG. 5a, a tubular section of restraint fabric 28 (which is illustrated herein as being cylindrical, though it need not be) is provided with a plurality of root cords 30-33, each of which is secured in the back of the tubular section at one respective point 34-37, such as by a single point of stitching, fusing, or other fastening 34-37, the cord being slidably restrained on the cylinder 28 (at all points except points 34-37), but not under tension or tied. Then, as illustrated in FIG. 5b, the cords are drawn together in a different manner and tied in order to form a convolute section employing the teachings of the present invention. Assume that the cylinder 28 has a circumference as illustrated in FIG. 5a of twenty inches, and that the circumference at each root in a finished convolute is desired to be eighteen inches; this means that the root cords must be tightened before tying so as to remove two inches of root cord from the cylinder. As illustrated in FIG. 5b, the root cord 30 is pulled evenly on both sides so that the semi-circumference from the point 34 to a point 38 at the front where the root cord will be tied is one inch shorter on each side (both the right and the left as seen in FIG. 5b), leaving the points 34 and 38 diametrically opposite one another. The root cord 33 is similarly drawn equally on both sides so as to reduce the length of cord adjacent to the cylinder 28 by one inch on each side and thereby leaving the point 37 diametrically opposite to a point 41 of tying the root cord. On the other hand, however, the entire two inches of circumference of the root cord 31 and of the root cord 32 is removed from the side which is to the left as viewed in FIG. 5b, the root cord being unadjusted to the right of the points 35 and 36 (between points 35, 36 and a pair of respective tie points 40, 41). This means that the center line or axis 42 of the roots 31, 32 have been moved to the right of a center line 44 of the roots 30, 33, which center line (44) is the center line for the fabric material of which the cylinder 28 is comprised. This results in a convolute section as illustrated in FIG. 6.

Figure 7:
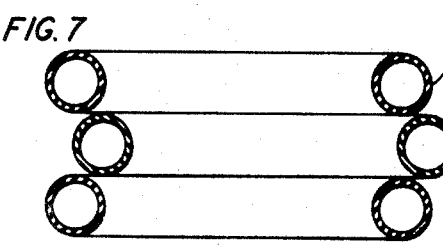
FIG. 7 is a schematicized cross-section of the toroidal analogy illustrated in FIG. 3.
Figure 8:
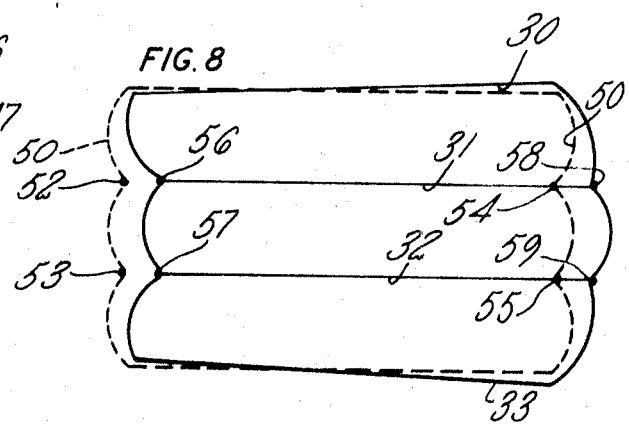
FIG. 8 is a schematicized cross-section of a convolute section of the type illustrated in FIGS. 5 and 6 herein in accordance with the present invention.

Another characteristic of such a convolute is illustrated in FIGS. 7 and 8. In FIG. 7, the toroids of FIGS. 1-4 are shown in cross-section, with the toroid displaced as illustrated in FIG. 3. Note, however, that the displacement of individual toroids does not alter the hemi-circumferential length between the points 46, 47 where the toroids are in mutual contact. In contrast, as illustrated in FIG. 8, since the points of juncture of the convolutes made in accordance with FIG. 5b change, while the length of material between like points along adjacent root cords remains the same, the shaping of the convolutes changes. Specifically, a set of three uniform convolutes is illustrated by the dotted line 50 in FIG. 8. Each convolute is shown to intersect the adjacent convolute at points 52-55. However, because of the fact that the root cords 31, 32 have been moved to the right as seen in FIGS. 5b and 8, the intersection of convolutes is also moved to the right as illustrated by points 56-59. Since the length of material in each convolute is the same, this results in a shortening of the convolute between root cords 30 and 31 at the left, and the lengthening of that convolute at the right, as well as the shortening of the convolute between root cords 32 and 33 at the left and the lengthening of that convolute at the right. This tends to cause the convolute to assume a bent position. Thus, a convolute section formed in accordance with the teachings of FIGS. 5a and 5b will be pre-bent if allowed to assume its own natural position, but will be generally straight with the shearing of convolutes as illustrated in FIGS. 5b and 6 if the section is stabilized at either end so as to avoid this natural tendency towards curvature.

Thus, a root cord restraint fabric convolute section can be fabricated to approximate the effect that is possible with independent toroids, to wit: that of having one of the sections displaced from another so as to provide stability in response to compressive forces applied thereto.

Figure 9:
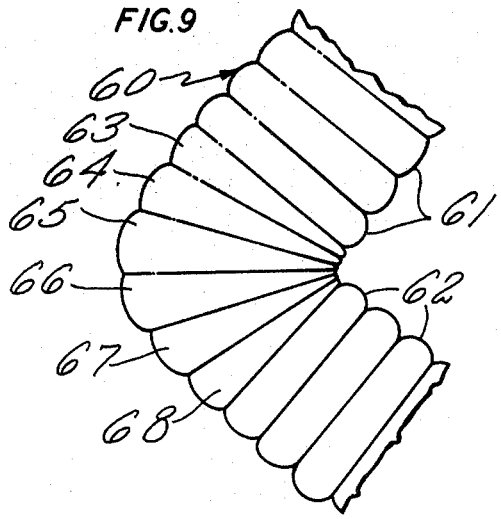
FIG. 9 is a schematicized side elevation of a flexed section of an idealized convolute.
Figure 10:
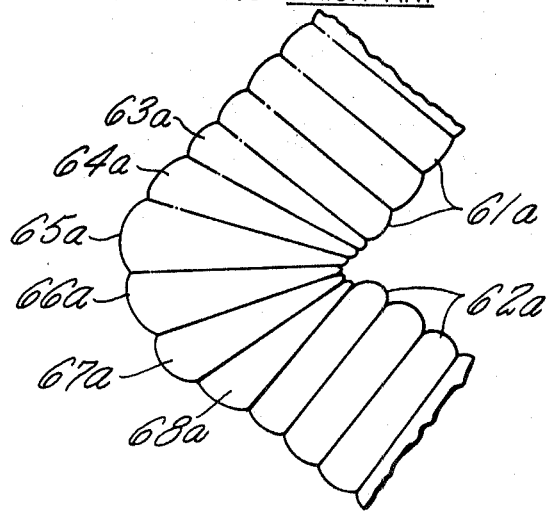
FIG. 10 is a side elevation of a flexed convolute section according to the prior art.

An illustration of a typical utilization of the present invention is given in FIGS. 9 and 10. Therein, a comparison is made between an ideal situation (which can be approximated with the present invention) and an actual situation of the prior art. In FIG. 9, a convolute section 60 is caused to bend through essentially a 90° angle. Ideally, this would leave convolutes 61, 62 at either end of the bend essentially straight and parallel as if there were no bend. A series of convolutes 63-68 are forced into varying degrees of taper (or wedging) as a result of the bend, the right ends (as viewed in FIG. 9) being compressed and the left ends being extended in order to form the bend. As illustrated in FIG. 9, in an ideal situation, the edges of the convolutes form a perfect bend, all of the adjustment in the shape of the convolutes occurring in the form of compression of one side and extension of the other side of the convolute to thereby assume a wedge shape. However, it has been discovered that convolutes in accordance with the prior art do not merely compress and extend as illustrated in FIG. 9, but also shear, as illustrated in FIG. 10. Therein it is assumed for simplicity that the convolutes 61a and 62a at either side of the bend remain straight and parallel as if there were no bend. However, the convolutes 63a-68a each not only become compressed at the right side (as viewed in FIG. 10) and extended at the left side, but also tend to shear to the left. This shearing to the left as illustrated in FIG. 10 is as a result of the fact that since the pressure within the convolute section is working against a much greater area at the left side of each of the convolutes 63a–68a than it is at the right side of these convolutes (since the right sides are relatively collapsed), there is a net force to the left in FIG. 10 over that to the right, resulting in shear. This force would cause an uncontrolled amount of shear if it weren't for the fact that each convolute is attached to an adjacent one, and that the shear will be limited to a point where equilibrium is reached as a result of tensil forces within the fabric from the skewing of the fabric that permits shearing of one convolute relative to an adjacent convolute. This is basically a function of the modulus of elasticity of the fabric when skewed as a result of the tendency of one convolute section to shear relative to the adjacent one. Thus a point of equilibrium is reached with the convolutes at the bend sheared relative to other convolutes in the section.

The present invention is utilized to overcome the difficulty illustrated in FIG. 10 (and to approximate the ideal situation illustrated in FIG. 9, by forming a convolute section which has its convolutes displaced to the right as illustrated in FIGS. 5b and 6 hereinbefore. Thus there is a natural tendency for the convolute section to be sheared toward the right, so that when the section is bent as illustrated in FIG. 9 and FIG. 10, the rightward sheared convolutes are brought into alignment as a result of the greater forces tending to push these convolutes to the left. Thus a section fabricated as illustrated in FIG. 6 will more nearly approximate the relative positioning of convolutes shown in FIG. 9 than is true of prior art sections as illustrated in FIG. 10.

Figure 11:
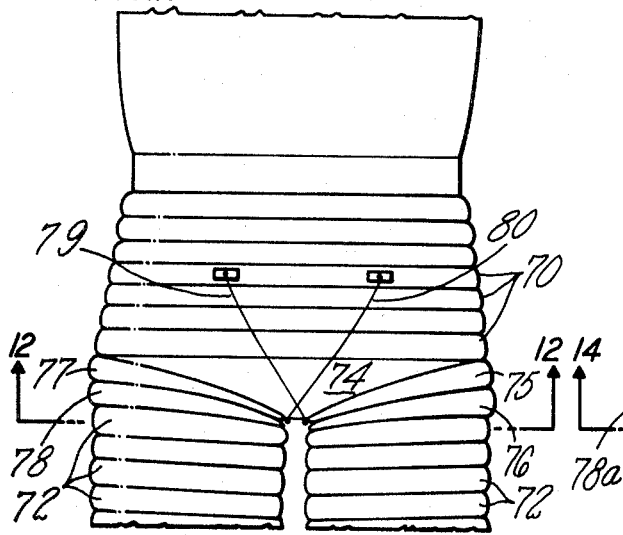
FIG. 11 is a schematicized front elevation of a hip-waist section in accordance with the prior art.
Figure 13:
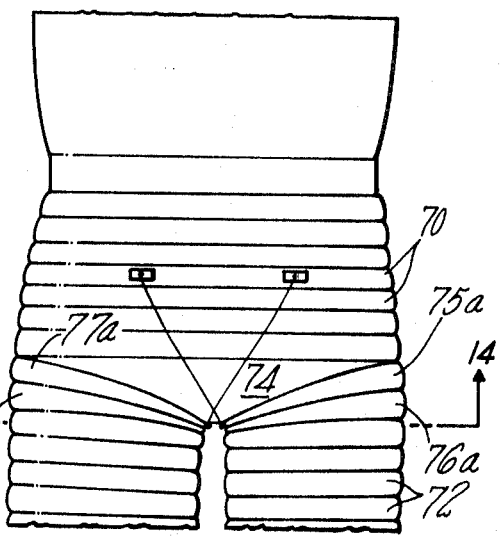
FIG. 13 is a schematicized front elevation of a hip section in acordance with the present invention.
Figure 12:
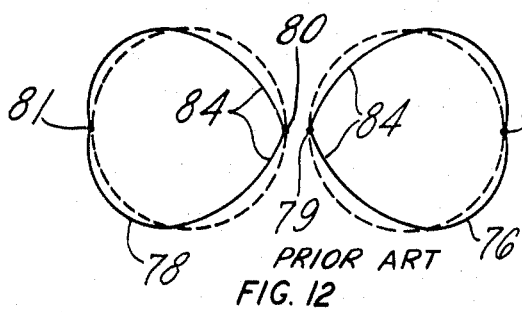
FIG. 12 is a schematice section illustrating the behavior of convolutes in the prior art hip section of FIG. 11.
Figure 14:
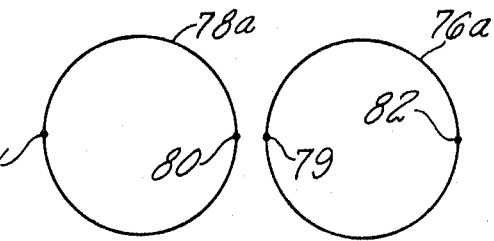
FIG. 14 is a schematic sectional view illustrating the behavior of convolutes in the hip section of FIG. 13 in acordance with the present invention.

Another aspect of the present invention is illustrated in FIGS. 11 and 12. In FIG. 11, a schematicized front elevation of the lower trunk, hip and upper thighs of a recently innovated pressurized suit is shown. Therein, a plurality of parallel convolutes 70 in the lower trunk (or stomach and upper buttocks) area are joined to relatively straight and parallel convolutes 72 at the top of the thigh by a transition section which includes a transition panel 74 and pairs of wedge-shaped convolutes 75–78. These wedge-shaped sections are employed because it has been found to provide excellent mobility to the mid section of the body in both right and left flexure at the waist as well as front and back flexure at the waist and flexure of either or both legs (such as when sitting down or when raising one knee). This is described more fully in a co-pending application of the same assignee entitled Pressurized Suit Hip-Waist, Ser. No. 785,711, filed on even date herewith by Getchell et al. As is described hereinbefore with respect to FIG. 2 and FIG. 10, because of the greater areas subjected to horizontal force components at the outside of the wedge-shaped convolutes 75, 76, they tend to shear toward the right and the convolutes 77 and 78 similarly tend to shear toward the left. However, due to the upward and inward forces exerted on the convolutes by a pair of restraint cables 79, 80, the convolutes do not just shear generally outwardly as they would if not restrained by the cables 79, 80. Referring to FIG. 12, the positions of the convolutes are fixed by the cables 79 and 80 as well as by dorsal restraint cables 81, 82 (not shown elsewhere herein), so that instead of shearing generally outwardly, the convolutes 78 and 76 (for instance) are heart-shaped rather than round. The dorsal restraint cables 81, 82, as is well known in the art, extend longitudinally along the outer periphery of the legs and tend to resist longitudinal stretching of the space suit as a result of the internal pressure pushing upwardly on the helmet and downwardly on the boots. Since these cables are under a relatively high tension, and are stabilized in their position as a result of being attached in the hip-waist area and downwardly along the thighs, the dorsal restraint cables 81, 82 are not easily pushed outward by the tendency of the wedge-shaped convolutes 75–78 to shear outwardly away from the crotch. This is what causes the convolutes to tend to form the two nodes of the heart shape at the outer sides of the upper thighs. Similarly, since the cable 79 tends to hold the convolute 75 toward the left, and the cable 80 tends to hold the convolute 77 toward the right, the points of the heart shape configuration of FIG. 12 are formed near the cables 79, 80. In other words, the convolutes 75–78 are restrained at two points, even though they are tending to shear outwardly, thus resulting in the heart shaped configuration illustrated in FIG. 12. This causes a cutting-in just forwardly and rearwardly of the medial most point of the thigh, where it joins the crotch, as indicated at points 84 in FIG. 12. In order to overcome cutting-in against the thigh (as at points 84), in a hip employing the present invention, the convolute sections 75a–78a are altered by providing a greater proportion of root cord per unit of material close into the crotch, and a lesser proportion of root cord per unit of material on the outsides of the hips. This tendency to shear (FIGS. 11 and 12), and the resulting cut-in, is avoided by artificially tending to cause the wedge shaped convolutes 75a, 76a to shear to the left and artificially tending to cause the wedge shaped convolutes 77a and 78a to shear to the right, thus compensating the tendency to shear which results from their wedge shape. The net result is to form essentially circular cross-sectioned convolutes as illustrated schematically in FIG. 14.

It has also been discovered that when a given joint is flexed a number of times (as illustrated in FIG. 10) the tendency toward shearing results in a shifting of material relative to the root cord in any given convolute. Referring again to FIG. 10, the bend therein illustrated tends to push the root cords to the left, but the material is resisting this motion since it is intimately formed with the material in adjacent convolutes. Stated alternatively, the axis of each root tends to move to the left, but it can do so only to the extent permitted by the skew of the material to which it is disposed, or by the shifting of this material along the root cord. When the material of the convolute is not secured to the root cord, then the material will tend to stay to the right as the root cord moves to the left, so that there is relatively less material per unit length of root cord at the left and relatively more material per unit length of root cord at the right. In other words, the material shifts along the root cord as a result of the forces which cause the shear as illustrated in FIG. 10. As a result of this, when the convolute section is again straightened out, it tends to remain partially sheared in the same direction as the shear resulting from the flexure (as illustrated in FIG. 10). When the section of FIG. 10 is straightened, it will have a shear toward the left of some of the convolutes 63a–68a, including at least the convolutes 65a and 66a. In other words, unsecured root cords can create sheared convolute sections, the direction of shear being in the same direction as flexures which cause this shear.

In accordance with the present invention, it has been discovered that this characteristic of root cord restrained convolute sections can be avoided by securing the root cord fixedly at distinct points about the convolute. This may be accomplished either through uniform distribution of the convolute fabric about the root cord, so as to result in a substantially cylindrical, straight and parallel convolute section. On the other hand, the fabric material may be distributed other than uniformly about the root cord in order to overcome tendencies to pinch or cut in at various positions, to establish preferential break points, or to overcome a natural tendency to shear (as illustrated in FIGS. 11–14). Thus, the invention herein incorporating the manipulation of characteristics of root cord restrained fabric convolutes may be practiced in at least two general ways: one way to ensure uniformity of the convolute over a life history of flexures, and the other way to compensate for tendencies toward shearing as a result of flexure or as a result of wedge-shaped convolute sections. In addition, the concept is broader, in that it may be utilized to overcome the tendency to cut in or shear at any point in a pressurized suit involving root cord restrained fabric convolutes as a result of variations in manufactured parameters and variations in the size and detailed shape of the wearer.

In practicing the present invention, root cords may be fixed with respect to fabric of convolutes formed thereby at a relatively few places or at a large number of places. For instance, as described hereinbefore with respect to FIG. 5b, a sheared convolute section may be purposely formed merely by fuzing the root cord at two places about the periphery of the convolute root; it could, however, be thereafter stitched at several points so as to avoid relative motion between incremental units of convolute fabric and incremental lengths of root cord. On the other hand, consider convolutes near the waist of a pressurized suit; these convolutes have a tendency to shift material relative to the root cord towards the front of the suit as a result of forward flexure (bending or sitting down); this tendency can be avoided by tacking the root cord to the fabric at a number of points such as, for instance, between eight and twenty points about the periphery of the root cord. Still further, the root cord may be firmly stitched in place all along its length once the proper section has been formed. However, it has been found that tacking at various points (such as every 15°) is adequate to maintain a convolute in its desired shape in accordance with the teachings of the present invention.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In the method of fabricating, for a pressurized suit, wedge-shaped convolutes comprising fabric and a root restraint, the steps of:
    positioning a relatively greater amount of fabric adjacent to incremental lengths of the root restraint at a side of the wedge-shaped convolute which is opposite to the apex of the wedge simulated thereby, relative to the amount of fabric adjacent to incremental lengths of said root restraint at the side of said convolute near the apex of the wedge simulated thereby;
    securing said root restraint to said incremental lengths of fabric at a sufficient number of points about the length of said root restraint to substantially maintain the distribution of fabric with respect to the root restraint established in said positioning step; and
    utilizing wedge-shaped convolutes as prepared above at selected locations in the fabrication of pressurized suits.

2. In the method of fabricating a fabric convolute section for a pressurized suit, restrained by a root restraint, which will resist a tendency to shear away from the apex of an angle of flexure which said convolute section is designed to undergo, the steps of:
    preparing at least one root of a convolute section near the point of intended flexure with a greater amount of convolute fabric adjacent to the given length of root restraint at a point on said root restraint which is substantially opposite to the apex of the angle of flexure for which said convolute section is designed, relative to the amount of fabric along a given length of said root restraint at a point on said root restraint nearest to said apex;
    affixing said root restraint to the incremental elements of fabric adjacent thereto at a sufficient number of points about the length of said root restraint to substantially maintain the distribution of fabric established in said preparing step; and
    utilizing fabric convolute sections as prepared above at locations subjected to flexure in the fabrication of pressurized suits.

3. In the method of adjusting a rooted fabric convolute section in a pressurized suit employing a root restraint, so as to avoid cutting in at a given point, the steps of:
    distributing the convolute fabric with respect to at least one root restraint thereof so as to provide a relatively greater amount of fabric adjacent to the root restraint at the point of cutting in and a relatively smaller amount of fabric at other points about the root restraint;
    securing said root restraint to said fabric at a sufficient number of points about the length of said root restraint to substantially maintain the distribution of fabric with respect to the root restraint established in said distributing step; and
    utilizing fabric convolute sections as prepared above in the preparation of pressurized suits to prevent cutting-in at selected locations.

4. In the method of adjusting a rooted fabric convolute section of a pressurized suit employing a root restraint, so as to provide a preferential break point, the steps of:
    distributing the fabric with respect to the root restraint thereof so as to provide a relatively greater amount of material adjacent to the root restraint at the point of desired break and a relatively smaller amount at the other points about the root restraint;
    securing said root restraint to said fabric at a sufficient number of points about the length of said root restraint so as to substantially maintain the distribution of fabric with respect to said root restraint established in said distributing step; and
    utilizing fabric convolute sections as prepared above in the preparation of pressurized suits to provide preferential break-points at desired locations.

References Cited

UNITED STATES PATENTS

| | | |
|---|---|---|
| 2,390,233 | 12/1945 | Akerman et al. ____ 2—2.1 A UX |
| 2,392,992 | 1/1946 | Martin _____ 2—2.1 |
| 2,410,632 | 11/1946 | Colley et al. _____ 2—2.1 A |
| 2,834,965 | 5/1958 | Flagg et al. _____ 285—226 |
| 2,954,562 | 10/1960 | Krupp _____ 2—2.1 A |
| 2,967,305 | 1/1961 | White et al. _____ 2—2.1 A |
| 2,989,324 | 6/1961 | O'Halloran _____ 2—2.1 X |
| 3,422,458 | 1/1969 | Schueller _____ 2—2.1 |
| 3,516,091 | 6/1970 | Marroni et al. _____ 2—2.1 |

FOREIGN PATENTS

| | | |
|---|---|---|
| 577,101 | 5/1946 | Great Britain _____ 2—2.1 |
| 974,426 | 11/1964 | Great Britain _____ 2—2.1 |

ROBERT R. MACKEY, Primary Examiner

U.S. Cl. X.R.

2—2.1; 28—77; 138—121; 285—226